United States Patent
Couture-Pelletier et al.

(10) Patent No.: US 11,884,353 B2
(45) Date of Patent: Jan. 30, 2024

(54) STEERING ASSEMBLY FOR A VEHICLE

(71) Applicant: BOMBARDIER RECREATIONAL PRODUCTS INC., Valcourt (CA)

(72) Inventors: Mathieu Couture-Pelletier, Bromont (CA); Kevin Cyrenne, Valcourt (CA)

(73) Assignee: BOMBARDIER RECREATIONAL PRODUCTS INC., Valcourt (CA)

( * ) Notice: Subject to any disclaimer, the term of this patent is extended or adjusted under 35 U.S.C. 154(b) by 476 days.

(21) Appl. No.: 17/059,849

(22) PCT Filed: May 29, 2019

(86) PCT No.: PCT/IB2019/054449
§ 371 (c)(1),
(2) Date: Nov. 30, 2020

(87) PCT Pub. No.: WO2019/229671
PCT Pub. Date: Dec. 5, 2019

(65) Prior Publication Data
US 2021/0214038 A1    Jul. 15, 2021

Related U.S. Application Data

(60) Provisional application No. 62/678,694, filed on May 31, 2018.

(51) Int. Cl.
*B62K 21/16*    (2006.01)
*B62J 50/22*    (2020.01)
(Continued)

(52) U.S. Cl.
CPC .............. *B62K 21/16* (2013.01); *B62J 50/22* (2020.02); *B62J 50/225* (2020.02); *B62K 5/027* (2013.01); *B62K 5/05* (2013.01)

(58) Field of Classification Search
CPC .......... B62K 21/16; B62K 5/027; B62K 5/05; B62K 2206/00; B62K 11/14; B62J 50/22; B62J 50/225
See application file for complete search history.

(56) References Cited

U.S. PATENT DOCUMENTS 1,164,122 A    12/1915    St. Yves
1,756,339 A    4/1930    Broberg
(Continued)

FOREIGN PATENT DOCUMENTS

CN    204037808 U    12/2014
CN    204250273 U    4/2015
(Continued)

OTHER PUBLICATIONS

International Search Report of PCT/IB2019/054449; dated Sep. 17, 2019, Lee W. Young.
(Continued)

*Primary Examiner* — Paul N Dickson
*Assistant Examiner* — Shams Dhanani
(74) *Attorney, Agent, or Firm* — BCF LLP

(57) ABSTRACT

A steering assembly for a vehicle includes a track pivotable about a steering axis, a slider slidably connected to the track, a handlebar connected to the slider, a lock actuator movable between a locked position and an unlocked position, and a rocker operatively connected to the lock actuator. The rocker is pivotable about a rocking axis relative to the slider. The handlebar, the slider, the lock actuator and the rocker are pivotable about the steering axis with the track. In the unlocked position of the lock actuator, the rocker and the handlebar are slidable along the track with the slider. In the locked position of the lock actuator, the rocker presses the slider against the track and thereby locks the slider, the rocker and the handlebar in position relative to the track.

23 Claims, 16 Drawing Sheets

(51) Int. Cl.
  *B62J 50/21* (2020.01)
  *B62K 5/027* (2013.01)
  *B62K 5/05* (2013.01)

(56) References Cited

U.S. PATENT DOCUMENTS

| | | | |
|---|---|---|---|
| 4,023,436 | A | 5/1977 | Dodge |
| 4,103,922 | A * | 8/1978 | Brilando ............... B62K 25/02 |
| | | | 280/279 |
| 4,361,057 | A | 11/1982 | Kochera |
| 4,384,497 | A | 5/1983 | Gatsos |
| 4,400,038 | A * | 8/1983 | Hosokawa ............ B60B 27/023 |
| | | | 301/124.2 |
| 4,420,989 | A | 12/1983 | Finkle |
| 4,682,509 | A | 7/1987 | Takamiya et al. |
| 5,323,664 | A | 6/1994 | Fairfield et al. |
| 5,458,213 | A | 10/1995 | Nakaya et al. |
| 5,685,201 | A | 11/1997 | Renshaw |
| 5,727,427 | A | 3/1998 | Nien |
| 5,813,258 | A * | 9/1998 | Cova ................... E05B 27/0028 |
| | | | 70/225 |
| 6,234,042 | B1 | 5/2001 | An |
| 6,467,787 | B1 | 10/2002 | Marsh |
| 6,619,683 | B1 | 9/2003 | Lin et al. |
| 6,668,681 | B2 | 12/2003 | Flum et al. |
| 6,761,417 | B2 * | 7/2004 | Denby ................... B62K 25/02 |
| | | | 301/124.2 |
| 6,973,853 | B2 | 12/2005 | Chang |
| 7,234,558 | B2 | 6/2007 | Toftner |
| 7,343,831 | B1 | 3/2008 | Tamcsin |
| 7,568,733 | B2 | 8/2009 | Bowers |
| 7,685,904 | B2 | 3/2010 | Cutsforth |
| 7,699,331 | B2 | 4/2010 | McVickar |
| 8,029,011 | B2 | 10/2011 | King et al. |
| 8,215,203 | B1 | 7/2012 | Swift |
| 8,226,120 | B2 | 7/2012 | Berg |
| 8,230,758 | B1 | 7/2012 | Eddy |
| 8,272,460 | B2 | 9/2012 | Song et al. |
| 8,297,148 | B1 | 10/2012 | Ferguson |
| 8,317,214 | B2 | 11/2012 | Athanasiou |
| 9,016,167 | B2 | 4/2015 | Degarate et al. |
| 9,038,500 | B1 | 5/2015 | Oravecz |
| 9,039,211 | B2 | 5/2015 | Hoff et al. |
| 9,272,748 | B1 | 3/2016 | Oravecz |
| 9,346,509 | B2 | 5/2016 | Hoff et al. |
| 9,873,385 | B2 * | 1/2018 | Tsai ...................... B60R 9/048 |
| 9,919,726 | B2 | 3/2018 | Labbe et al. |
| 2006/0230872 | A1 | 10/2006 | Huang |
| 2009/0121538 | A1 * | 5/2009 | Chang .................. B62K 25/02 |
| | | | 301/124.2 |
| 2014/0137699 | A1 | 5/2014 | Hutto |
| 2015/0050073 | A1 | 2/2015 | Forgrave |
| 2015/0344098 | A1 | 12/2015 | Freixes Folch |
| 2015/0360713 | A1 | 12/2015 | Labbe et al. |
| 2016/0075394 | A1 | 3/2016 | Gardiner |
| 2016/0075396 | A1 | 3/2016 | Gardiner |
| 2016/0096580 | A1 | 4/2016 | Harman |
| 2021/0086863 | A1 * | 3/2021 | Wang .................... B62K 21/18 |
| 2022/0348283 | A1 * | 11/2022 | Sorenson ............... B62L 3/023 |
| 2023/0025681 | A1 * | 1/2023 | Liu ....................... B62K 25/02 |

FOREIGN PATENT DOCUMENTS

| | | |
|---|---|---|
| DE | 19910489 A1 | 9/2000 |
| DE | 202011052448 U1 | 3/2012 |
| FR | 3037033 B1 | 4/2018 |
| JP | 2016113058 A | 6/2016 |

OTHER PUBLICATIONS

English Abstract of FR3037033; Retrieved on Nov. 27, 2020; Retrieved from www.worlwide.espacenet.

English Abstract of DE202011052448; Retrieved on Nov. 27, 2020; Retrieved from www.worlwide.espacenet.

Extended European Search Report dated Feb. 11, 2022 by the EPO in connection with the corresponding application No. 19811706.1.

* cited by examiner

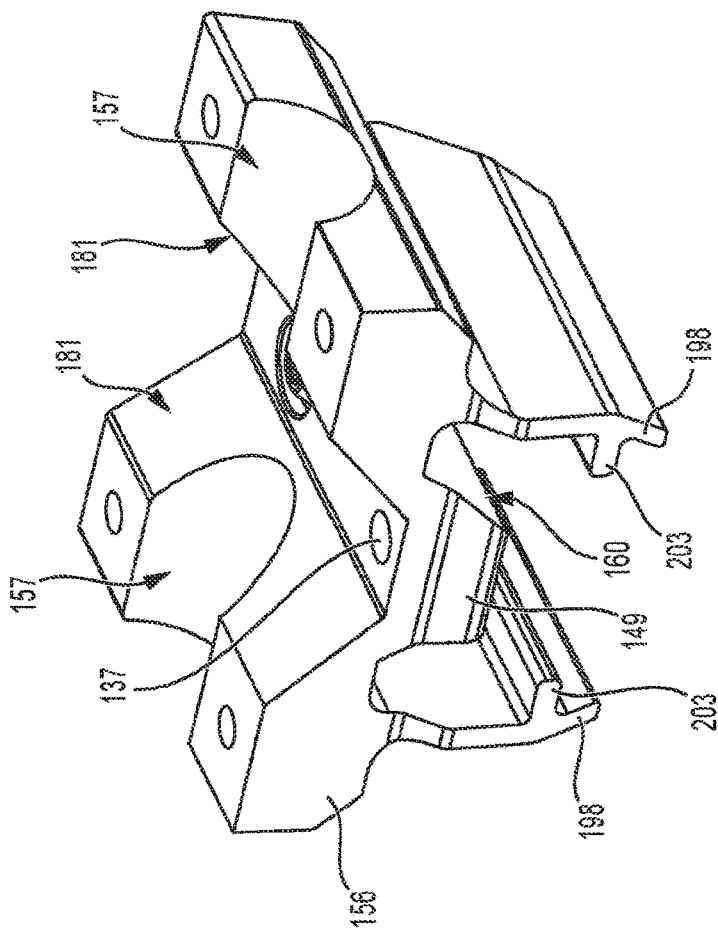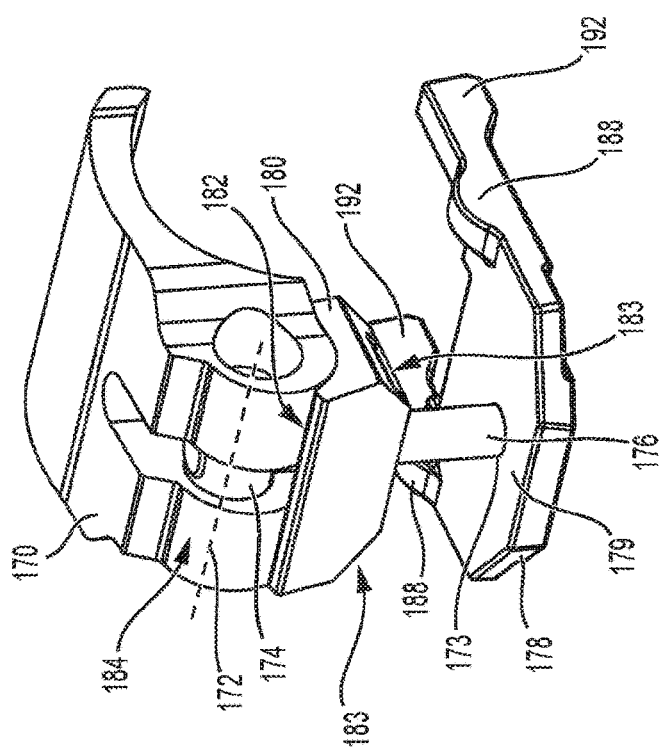
FIG. 8

STEERING ASSEMBLY FOR A VEHICLE

CROSS-REFERENCE

The present application claims priority to U.S. Provisional Patent Application No. 62/678,694, filed on May 31, 2018, the entirety of which is incorporated herein by reference.

TECHNICAL FIELD

The present technology relates to steering assemblies for vehicles, and more specifically to steering assemblies having an adjustable handlebar.

BACKGROUND

Adjustable handlebar assemblies for straddle-seat vehicles and the like are well known. Some such assemblies enable the raising and lowering of the handlebar with respect to the rest of the vehicle, and/or the pivoting of the handlebar.

Many prior art systems clamp a moving piece (or pieces) in place. Such a process often requires tools to tighten/loosen a bolt or the like.

There is therefore a desire for an adjustable handlebar assembly that enables a wide range of adjustment for the user, without the use of tools.

SUMMARY

It is an object of the present technology to ameliorate at least some of the inconveniences present in the prior art.

According to one aspect of the present technology, there is provided a steering assembly for a vehicle, the steering assembly including: a track pivotable about a steering axis; a slider slidably connected to the track; a handlebar connected to the slider; a lock actuator movable between a locked position and an unlocked position; and a rocker operatively connected to the lock actuator, the rocker being pivotable about a rocking axis relative to the slider, the handlebar, the slider, the lock actuator and the rocker being pivotable about the steering axis with the track. In the unlocked position of the lock actuator, the rocker and the handlebar are slidable along the track with the slider. In the locked position of the lock actuator, the rocker presses the slider against the track and thereby locks the slider, the rocker and the handlebar in position relative to the track.

In some implementations, the lock actuator is slidable along the track with the slider, the handlebar and the rocker when the lock actuator is in the unlocked position.

In some implementations, the steering axis is perpendicular to the rocking axis.

In some implementations, the track and the slider have complementary angled surfaces that are pressed together by the rocker when the lock actuator is in the locked position.

In some implementations, the track defines a sliding axis along which the slider is slidable when the lock actuator is in the unlocked position; the complementary angled surfaces are symmetric about a plane of symmetry when the lock actuator is in the locked position; and the sliding axis is in the plane of symmetry.

In some implementations, the angled surfaces of the track face toward the plane of symmetry, and the angled surfaces of the slider face away from the plane of symmetry toward the angled surfaces of the track.

In some implementations, the angled surfaces of the track extend downward and toward the plane of symmetry.

In some implementations, the sliding axis is perpendicular to the rocking axis.

In some implementations, the rocker includes at least one protrusion contacting the track, the at least one protrusion defining the rocking axis.

In some implementations, the lock actuator includes a lever manually pivotable about a lever pivot axis between the locked and the unlocked positions.

In some implementations, the track is positioned at least in part between the lever and the rocker.

In some implementations, the lock actuator further includes a shaft and an elongate member, the shaft defines the lever pivot axis, the lever is pivotable about the shaft between the locked and unlocked positions, the elongate member is perpendicular to the shaft, and the elongate member connects the rocker to the shaft for pivoting the rocker about the rocking axis as the lever pivots between the locked and unlocked positions.

In some implementations, the steering assembly further includes a seat defining a concave seat surface; the lever includes a cylindrical outer surface abutting the concave seat surface, and the cylindrical outer surface is eccentric relative to the lever pivot axis such that the lever pivot axis, the shaft and the elongate member move relative to the track as the lever pivots between the locked and unlocked positions for pivoting the rocker about the rocking axis.

In some implementations, the seat and the slider have complementary angled surfaces that are pressed together by the lever and the rocker when the lever is in the locked position.

In some implementations, the shaft, the elongate member and the seat are on a first longitudinal side of the handlebar; and the rocker includes at least a portion that contacts the slider on a second longitudinal side of the handlebar when the lever is in the locked position, the second longitudinal side of the handlebar being opposite the first longitudinal side of the handlebar.

In some implementations, the steering assembly further includes an instrument display mounted to the track; and the shaft, the elongate member and the seat are positioned between the handlebar and the instrument display.

In some implementations, the seat and the handlebar are positioned between the lever and the slider when the lever is in the locked position.

In some implementations, the lever extends over the handlebar when the lever is in the locked position.

In some implementations, the track defines at least one rail along which the slider is slidable when the lock actuator is in the unlocked position; the handlebar, the lever and at least a portion of the slider are disposed on a first side of the at least one rail; and the rocker is disposed on a second side of the at least one rail, the second side of the at least one rail being opposite the first side of the at least one rail.

In some implementations, the steering assembly further includes a steering column operatively connected to the track; and the steering column defines the steering axis and is pivotable about the steering axis with the track.

According to another aspect of the present technology, there is provided a vehicle that includes a straddle seat, the steering assembly, and at least one steerable component that is operatively connected to the steering assembly for steering the vehicle when the handlebar is pivoted about the steering axis.

In some implementations, the steering assembly is disposed at least in part forward of the straddle seat.

In some implementations, in the unlocked position of the lock actuator of the steering assembly, the handlebar of the steering assembly is movable relative to the straddle seat.

In some implementations, the at least one steerable component is at least one wheel.

In some implementations, the at least one wheel is two front wheels; the vehicle further includes: a frame; at least one rear wheel operatively connected to the frame; and a motor connected to the frame and operatively connected to the at least one rear wheel; and the two front wheels are operatively connected to the frame.

For purposes of this application, terms related to spatial orientation such as forward, rearward, upward, downward, left, and right, as they are used in this document refer to general directions as would be understood by a driver of a vehicle sitting in a driver seat of the vehicle and facing in a straight forward driving direction. Terms related to spatial orientation when describing or referring to components or sub-assemblies of a vehicle separately from the vehicle should be understood as they would be understood when these components or sub-assemblies are mounted to the vehicle, unless specified otherwise in this application.

Embodiments of the present technology each have at least one of the above-mentioned object and/or aspects, but do not necessarily have all of them. It should be understood that some aspects of the present technology that have resulted from attempting to attain the above-mentioned object may not satisfy this object and/or may satisfy other objects not specifically recited herein.

Additional and/or alternative features, aspects and advantages of embodiments of the present technology will become apparent from the following description, the accompanying drawings and the appended claims.

BRIEF DESCRIPTION OF THE DRAWINGS

For a better understanding of the present technology, as well as other aspects and further features thereof, reference is made to the following description which is to be used in conjunction with the accompanying drawings, where:

FIG. 8 is a front, left, top side perspective view of the lock actuator, a rocker and a slider of the steering assembly of FIG. 4;

DETAILED DESCRIPTION

The present technology will be described herein with respect to a three-wheeled straddle-type vehicle 100. It is contemplated that the present technology could also be implemented with vehicles that have two, four, or more wheels, as well as with other types of vehicles including, but not limited to, marine vehicles such as personal watercraft and snowmobiles.

Figure 1:
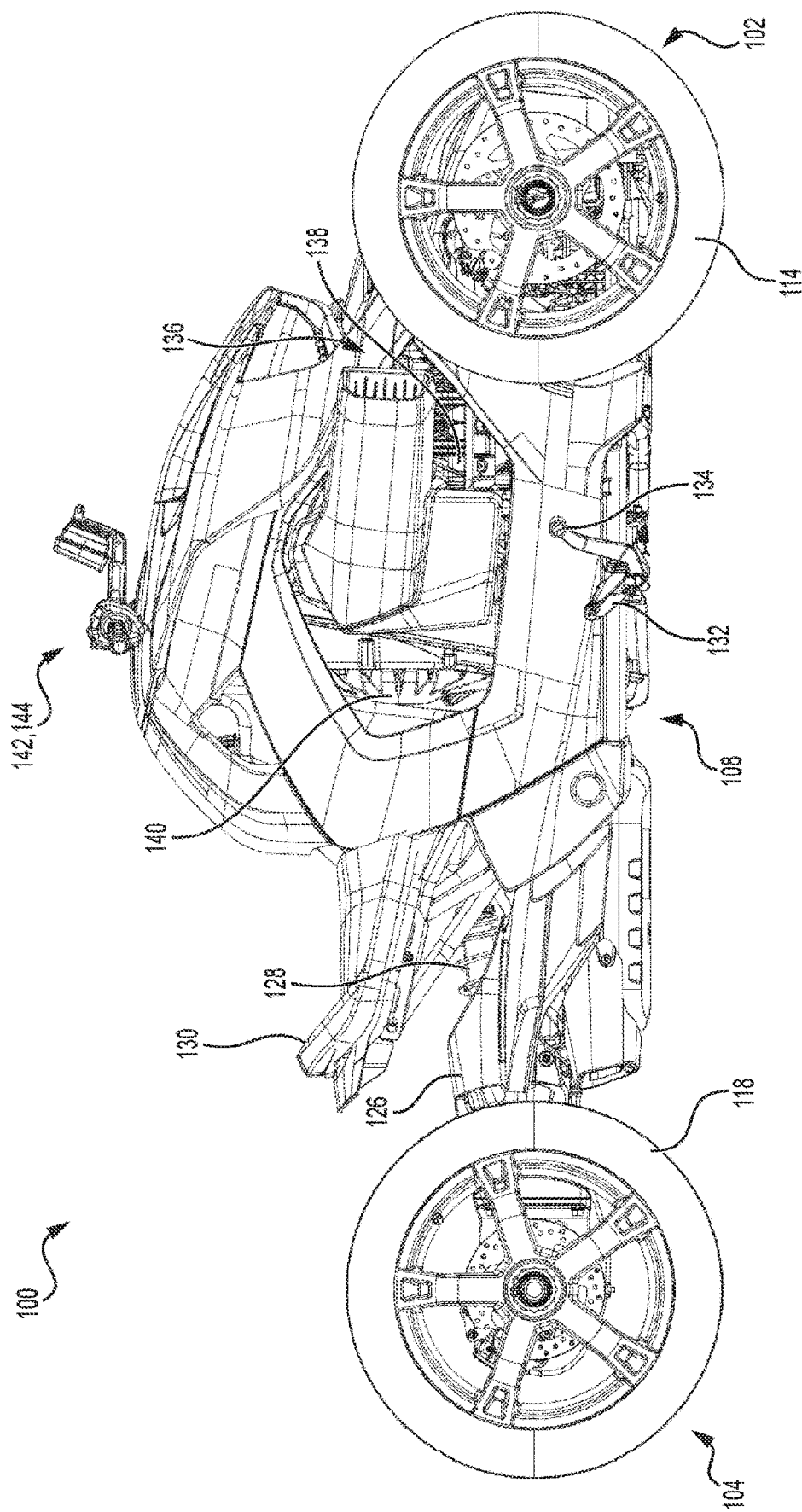
FIG. 1 is a right side elevation view of a vehicle.
Figure 2:
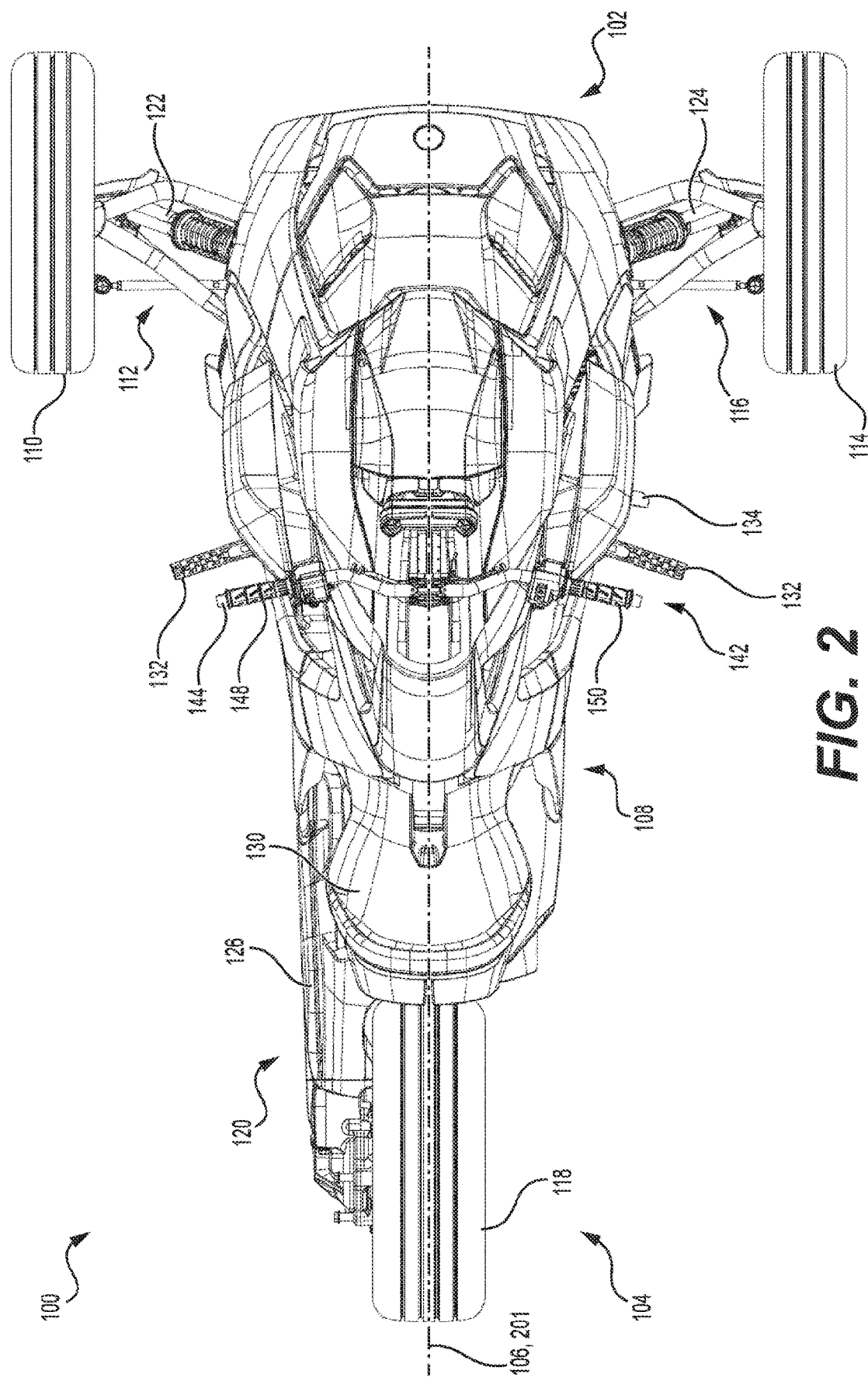
FIG. 2 is a top plan view of the vehicle of FIG. 1.
Figure 3:
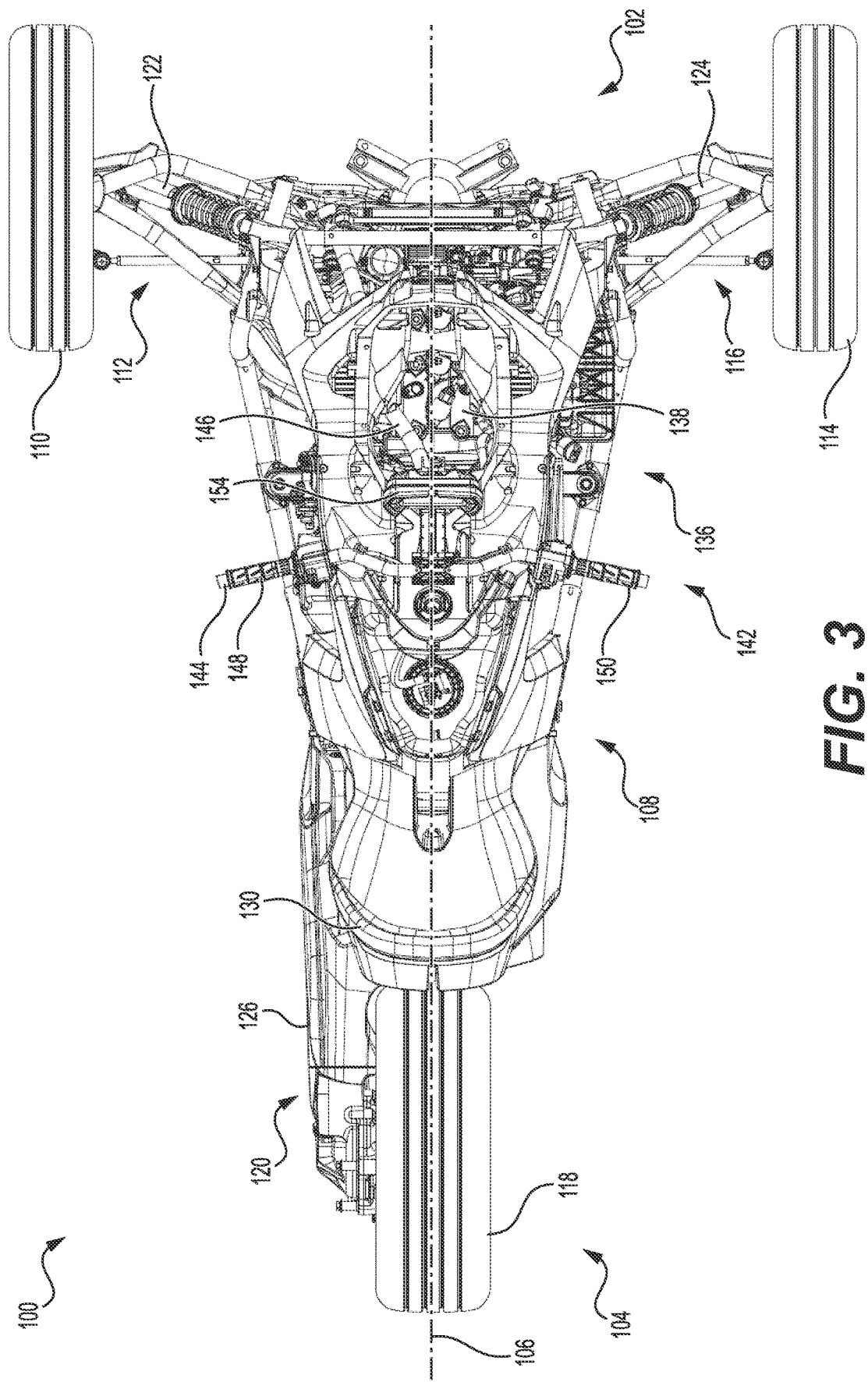
FIG. 3 is a top plan view of the vehicle of FIG. 1, with some panels of the vehicle removed to better show internal components of the vehicle.

With reference to FIGS. 1 to 3, a vehicle 100 has a front end 102, a rear end 104, and a longitudinal centerplane 106 (FIGS. 2 and 3) defined consistently with the forward travel direction of the vehicle 100. The vehicle 100 has a frame 108, a left front wheel 110 mounted to the frame 108 on a left side thereof by a left front suspension assembly 112, and a right front wheel 114 mounted to the frame 108 on a right side thereof by a right front suspension assembly 116. A single rear wheel 118 is mounted to the frame 108 at a rear end thereof by a rear suspension assembly 120. The left and right front wheels 110, 114 and the rear wheel 118 each have a tire secured thereto. The front wheels 110, 114 are disposed equidistant from the longitudinal centerplane 106, and the rear wheel 118 is centered with respect to the longitudinal centerplane 106. It is contemplated that the present technology could also be implemented on a vehicle with two rear wheels 118 and a single, centered front wheel 110 or 114.

In the illustrated embodiment and as can be seen in FIGS. 2 and 3, each front suspension assembly 112, 116 is a double A-arm type suspension, also known as a double wishbone suspension, and includes a corresponding shock absorber 122, 124. It is contemplated that other types of front suspensions, such as a McPherson strut suspension, or swing arm could be used. The rear suspension assembly 120 includes a swing arm 126 and a shock absorber 128 (FIG. 1). The shock absorber 128 is connected between the swing arm 126 and the frame 108. It is contemplated that other types of rear suspensions could be used.

The vehicle 100 has a straddle seat 130 mounted to an upper portion of the frame 108 and disposed along the longitudinal centerplane 106. It is contemplated that other mounting locations could be used. In the illustrated embodiment, the straddle seat 130 is designed to accommodate a single adult-sized rider, i.e. the driver. It is contemplated that other types of seats could be used such as a seat having a driver portion and a passenger portion.

Driver footrests 132 are disposed on both sides of the vehicle 100 to support the driver's feet (see FIGS. 2 and 3). The driver footrests 132 are connected to a lower portion of the frame 108. The driver footrests 132 are in the form of foot pegs disposed longitudinally forward of the straddle seat 130. It is also contemplated that the footrests 132 could be in the form of footboards. It is contemplated that the vehicle 100 could also be provided with passenger footrests disposed rearward of the driver footrests 132 on both sides of the vehicle 100, for supporting a passenger's feet when a passenger seat portion for accommodating a passenger is provided to the vehicle 100. A brake pedal 134 is connected to the right driver footrest 132 for braking the vehicle 100. The brake pedal 134 extends upwardly and forwardly from the right driver footrest 132 such that the driver can actuate the brake pedal 134 with a front portion of the right foot while a rear portion of the right foot remains on the right driver footrest 132.

As can be seen in FIGS. 1 and 3, the vehicle 100 includes a power pack 136, including a motor 138 and a transmission assembly 140 (FIG. 1). The power pack 136 is supported by and is housed within the frame 108. The transmission assembly 140 includes a continuously variable transmission (CVT) and a transfer case. The motor 138 is in the form of an internal combustion engine. It is however contemplated that the motor 138 could be other than an internal combustion engine, for example an electric motor, a hybrid or the like. It is also contemplated that the transmission assembly 140 could be of another type. The motor 138 is operatively connected to the rear wheel 118 via the transmission assembly 140 to drive the rear wheel 118.

The vehicle 100 further includes a steering assembly 142. With reference to FIGS. 4 to 16, the steering assembly 142 includes a handlebar 144 which is disposed in front of the seat 130. The handlebar 144 is operatively connected to the front wheels 110, 114 via a steering column 146 (FIG. 3). The steering assembly 142 defines a steering axis 147 about which the handlebar 144 rotates with respect to the frame 108. The handlebar 144 is turned by the driver about the steering axis 147 to steer the front wheels 110, 114 and thereby steer the vehicle 100. The front wheels 110, 114 are one example of steerable components with which embodiments of the steering assembly 142 could be used. It is contemplated that embodiments of the steering assembly 142 could be used on vehicles where the steerable component(s) is/are skis, a jet propulsion steering nozzle of a personal watercraft, or endless tracks for example.

The connection between the handlebar 144 and the steering column 146 is described in more detail herein below. A left hand grip 148 is placed around the left side of the handlebar 144 near the left end thereof and a right hand grip 150 is placed around the right side of the handlebar 144 near the right end thereof. The right hand grip 150 provides twist-grip type throttle control. It is contemplated that a different type and/or position of throttle control could be used.

Figure 5:
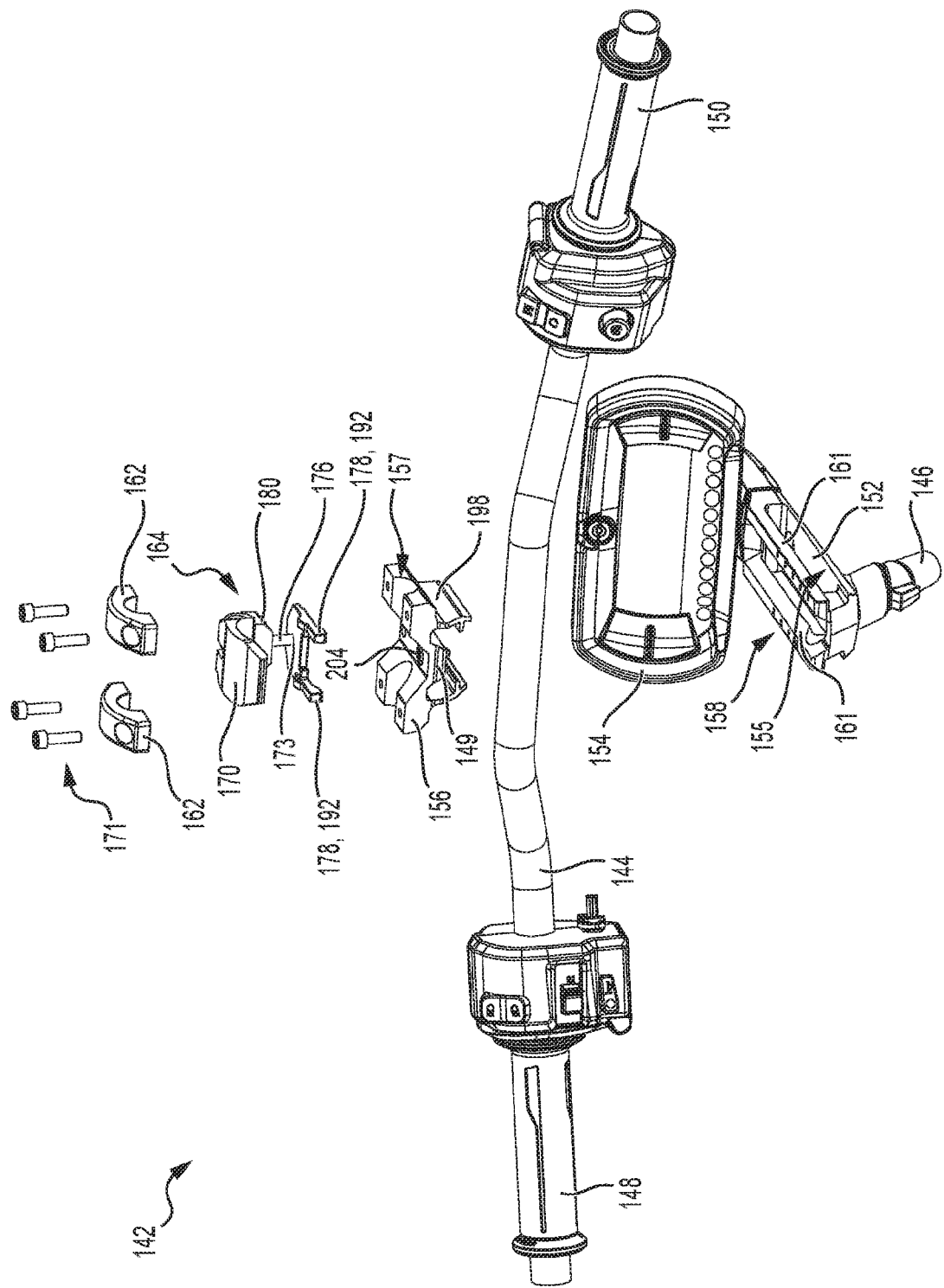
FIG. 5 is a rear, right, top side partially exploded perspective view of the steering assembly of FIG. 4.

The steering assembly 142 of the vehicle 100 includes a track 152 connected to an upper end of the steering column 146, such that the track 152 pivots together with the steering column 146. As best shown in FIG. 5, in this embodiment, the track 152 includes two parallel rails 161 at a top side thereof, and a lower portion 155 below the rails 161. The rails 161 provide angled surfaces 158 (one surface 158 per rail 161, in this implementation), which extend downwardly and inwardly toward a plane of symmetry 145 (FIG. 9) of the track 152. A plurality of marks 159 are provided on the rails 161 to provide a visual indication of the different handlebar adjustment positions (described in more detail herein below) of the steering assembly 142. It is contemplated that the marks 159 could be omitted. It is contemplated that a different number and/or arrangement of rails 161 could be used, depending on the particular configuration of the components to be connected thereto which are described below.

In the present embodiment, when the steering assembly 142 is in the straight-ahead steering position shown in FIGS. 2 and 3, the track 152 is centered with respect to the longitudinal centerplane 106 and is disposed along the longitudinal centerplane 106. In the present embodiment, in this position, the track 152 extends forward of the steering column 146. An instrument display 154, also referred to as a gauge, is connected to a front portion of the track 152. It is contemplated that in some embodiments, the instrument display 154 could have a different position on the vehicle 100 and/or could be omitted.

Figure 4:
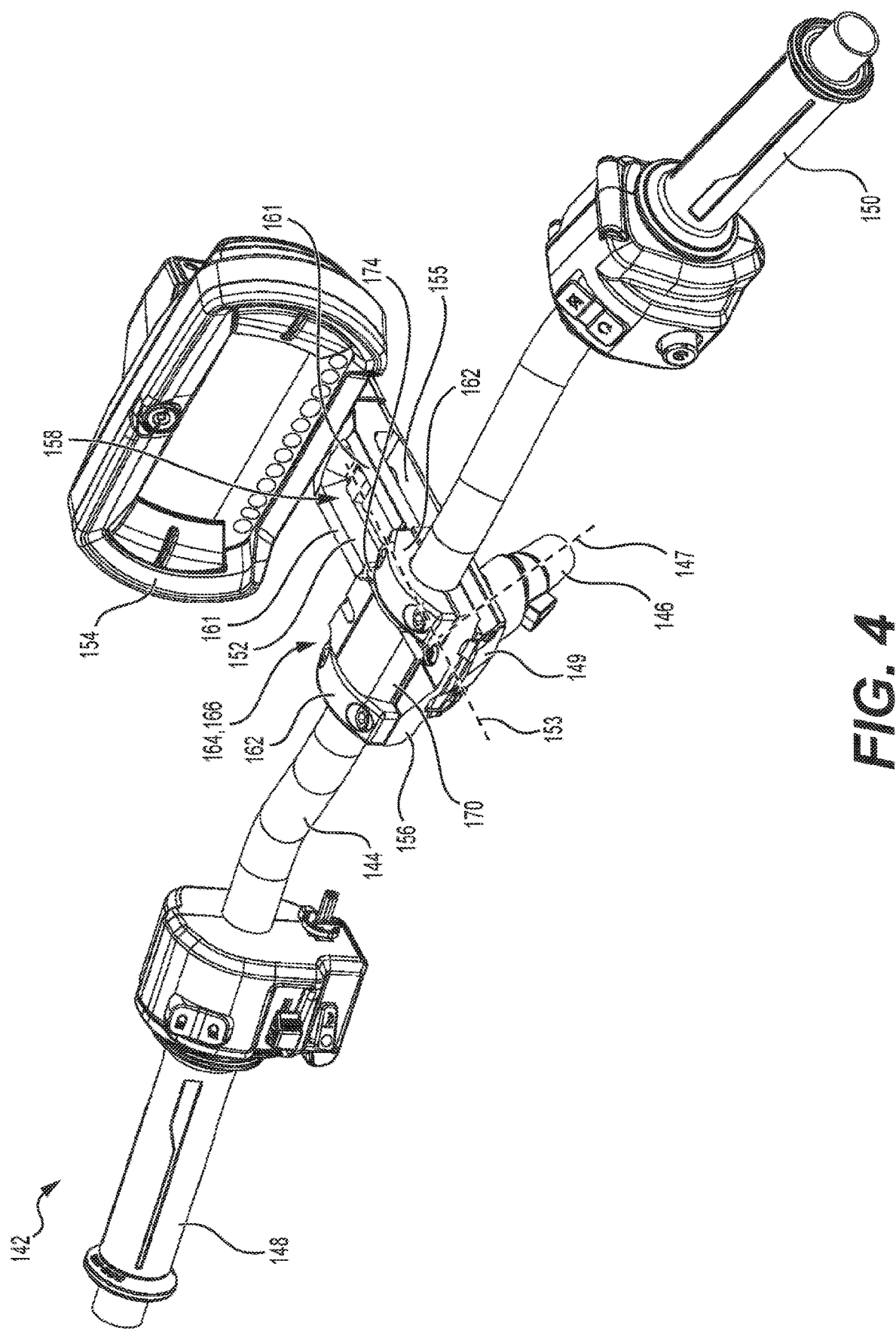
FIG. 4 is a rear, right, top side perspective view of a steering assembly of the vehicle of FIG. 1.

As best shown in FIGS. 5 to 8, the steering assembly 142 further includes a slider 156. The slider 156 includes a top portion 157 receiving the handlebar 144, a central portion 149 defining longitudinal opposed angled surfaces 160 (FIG. 8) for clamping against the rails 161 of the track 152 as will be described in further detail below, and downwardly-extending side walls 198. As best shown in FIG. 8, each of the side walls 198 includes a ledge 203 extending inwardly therefrom, toward the plane of symmetry 145 (FIG. 9) of the track 152 when the steering assembly 142 is assembled. Extremities of the side walls 198 extend downward and laterally inward toward the plane of symmetry 145 so as to partially wrap around the lower portion 155 of the track 152. The slider 156 is slidably connected to the track 152 and is slidable along the track 152 about a sliding axis 153 defined by the track 152 to a plurality of different adjustment positions distributed along the sliding axis 153. In this implementation, the angled surfaces 160 of the slider 156 slide along the angled surfaces 158 of the rails 161 as the slider 156 slides along the sliding axis 153 relative to the track 152 to different adjustment positions. The side walls 198 help guide the sliding motion of the slider 156 relative to the track 152 and help to vertically retain the slider 156 on the track 152. A rearmost adjustment position of the plurality of different adjustment positions is shown in FIG. 4. A forward-most adjustment position of the plurality of different adjustment positions shown in FIG. 7.

The handlebar 144 is connected to the slider 156 at the top portion 157 of the slider 156, via two brackets 162. The two brackets 162 are fastened to the top portion 157 of the slider 156 via corresponding bolts 171. In this embodiment, the brackets 162 clamp the handlebar 144 to the top portion 157 of the slider 156 and thereby immobilize it relative to the slider 156. The handlebar 144 therefore slides with the slider 156 relative to the track 152 along the sliding axis 153. It is contemplated that a different mounting of the handlebar 144 to the slider 156 could be used.

As can be seen in FIGS. 5 and 8, the steering assembly 142 further includes a lock actuator 164. As described in more detail herein below, the lock actuator 164 selectively locks the slider 156 and the handlebar 144 at the rearmost adjustment position (FIG. 4), at the forward-most adjustment position (FIG. 7), or at any adjustment position therebetween distributed along the sliding axis 153. The lock actuator 164 is movable between a locked position 166 (FIGS. 4 and 7), in which it locks the slider 156 and the handlebar 144 relative to the track 152 in a given one of the different adjustment positions, and an unlocked position 168 (FIG. 6) in which it allows the slider 156 and the handlebar 144 to slide to any one of the different adjustment positions along the track 152.

Figure 6:
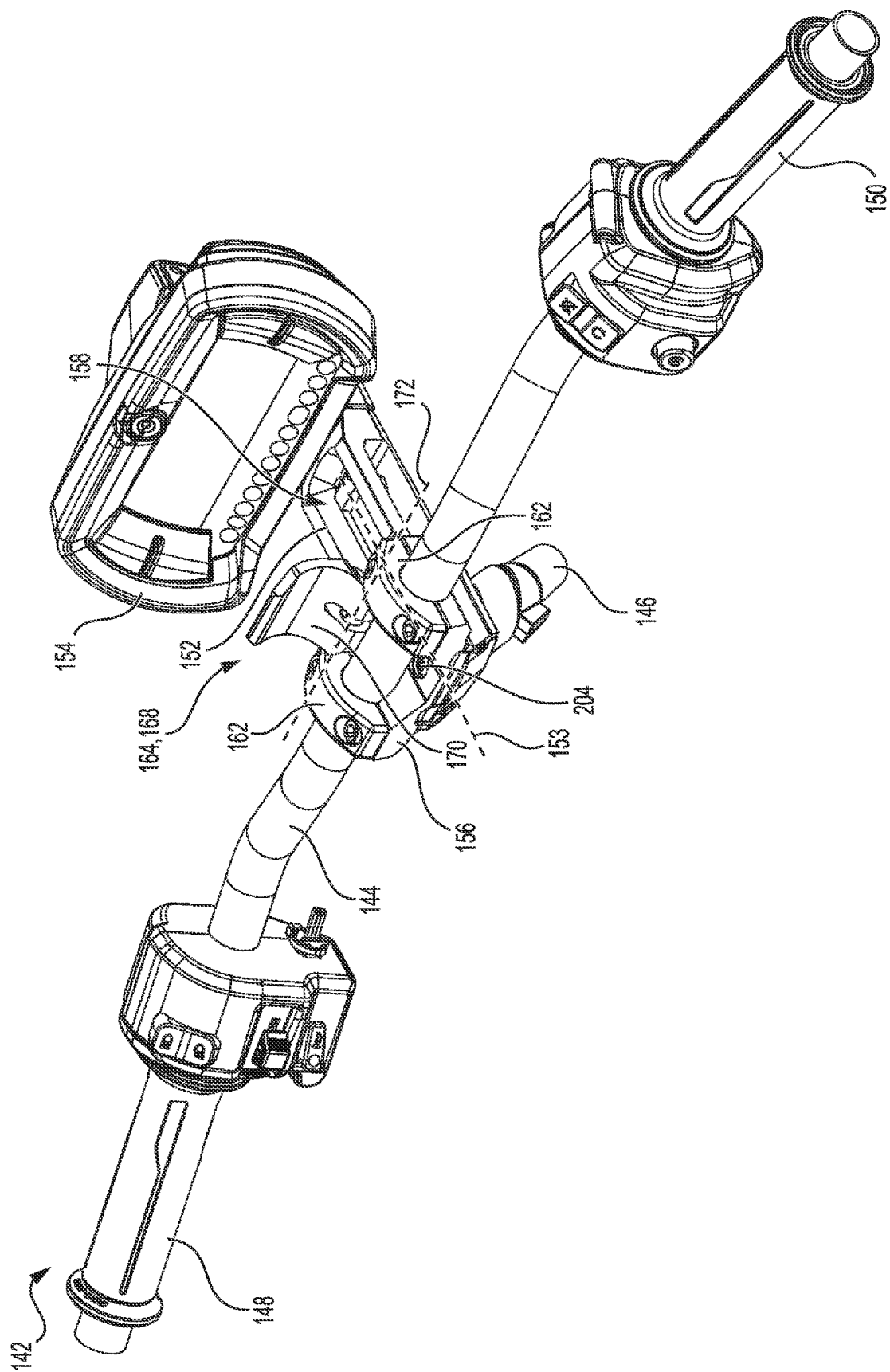
FIG. 6 is a rear, right, top side perspective view of the steering assembly of FIG. 4, with a lock actuator of the steering assembly being in an unlocked position and a handlebar of the steering assembly being in a rearmost adjustment position.
Figure 7:
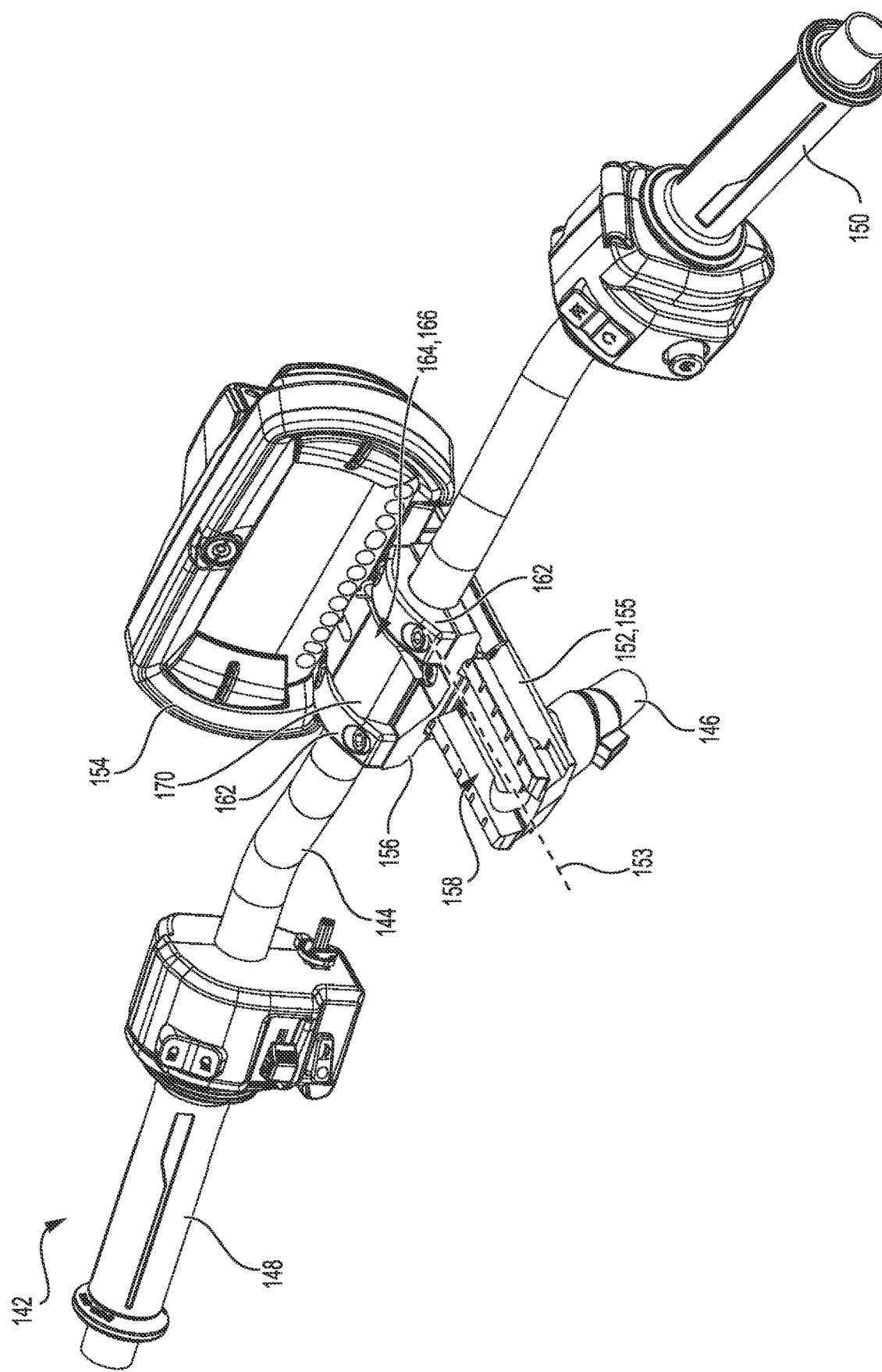
FIG. 7 is a rear, right, top side perspective view of the steering assembly of FIG. 4, with the lock actuator of the steering assembly being in a locked position and the handlebar of the steering assembly being in a forwardmost adjustment position.
Figure 9:
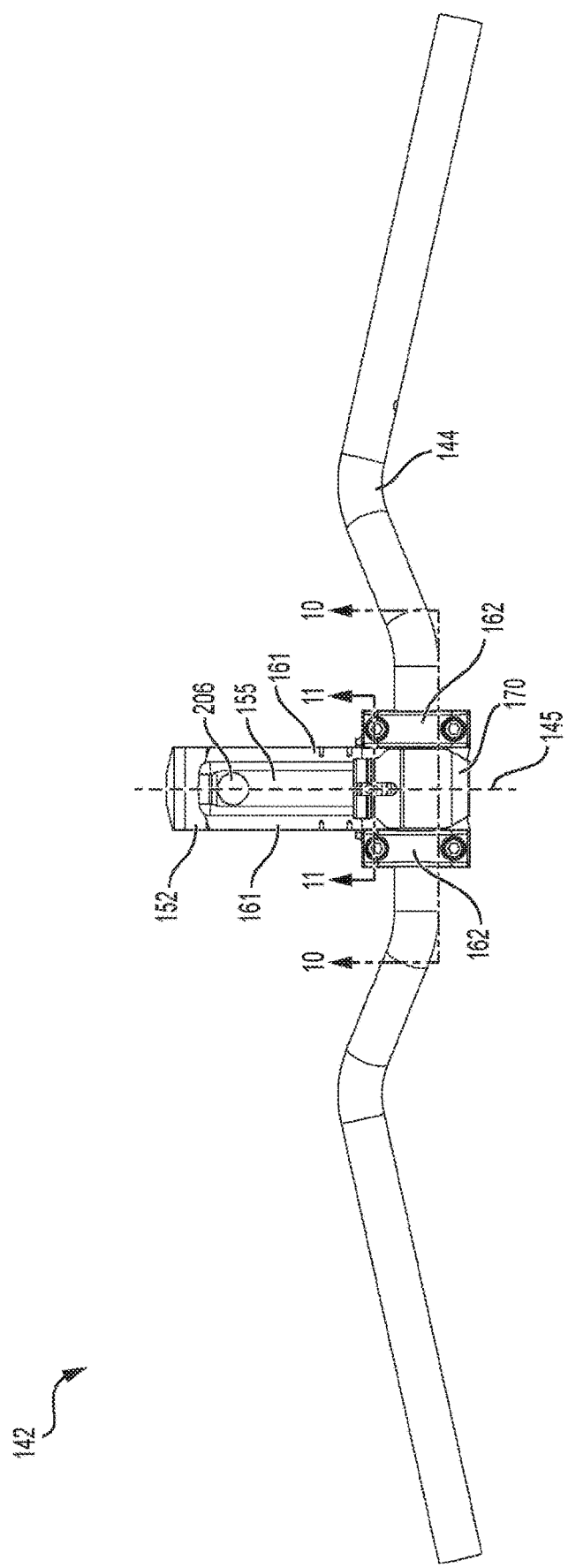
FIG. 9 is a top plan view of the steering assembly of FIG. 4, with some parts removed.

As best shown in FIG. 8, the lock actuator 164 includes a lever 170 which is manually pivotable about a lever pivot axis 172. The lever 170 is pivotable about the lever pivot axis 172 between the locked position 166 (FIG. 4) and the unlocked position 168 (FIG. 6). To this end, the lever 170 is pivotably mounted over a shaft 174 that defines the lever pivot axis 172. An elongate member 176 extends between the shaft 174 and a rocker 178. In this embodiment, the elongate member 176 is a bolt 176 that is fastened at one end into a threaded aperture defined in the shaft 174 perpendicular to the shaft 174. The other end of the bolt 176 is received through an aperture 173 (best shown schematically in FIGS. 15 and 16) defined through a front portion 179 of the rocker 178, with the head of the bolt 176 being positioned below and engaging the rocker 178. The aperture 173 is slightly larger than a diameter of the bolt 176 to accommodate movement of the bolt 176 relative to the rocker 178, and is smaller than a diameter of the head of the bolt 176 to prevent disengagement of the bolt 176 from the rocker 178. The elongate member 176 thereby operatively connects the rocker 178 to the shaft 174 and the lever 170. It is contemplated that any other suitable connecting structure could operatively connect the bolt 176, or other elongate member 176, to the rocker 178.

Figure 10:
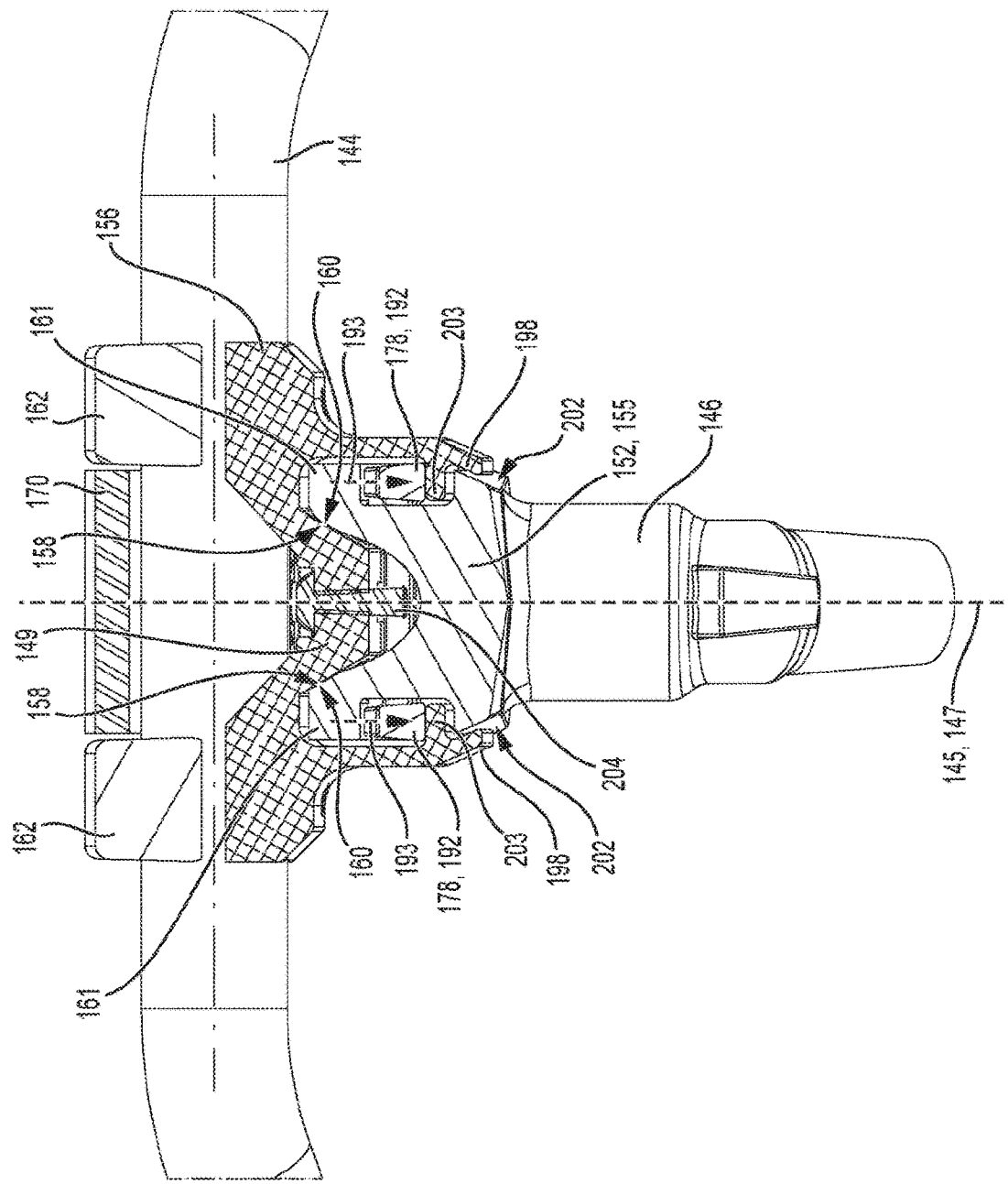
FIG. 10 is a cross-section of the steering assembly of FIG. 4, taken along section line 10-10 of FIG. 9.
Figure 11:
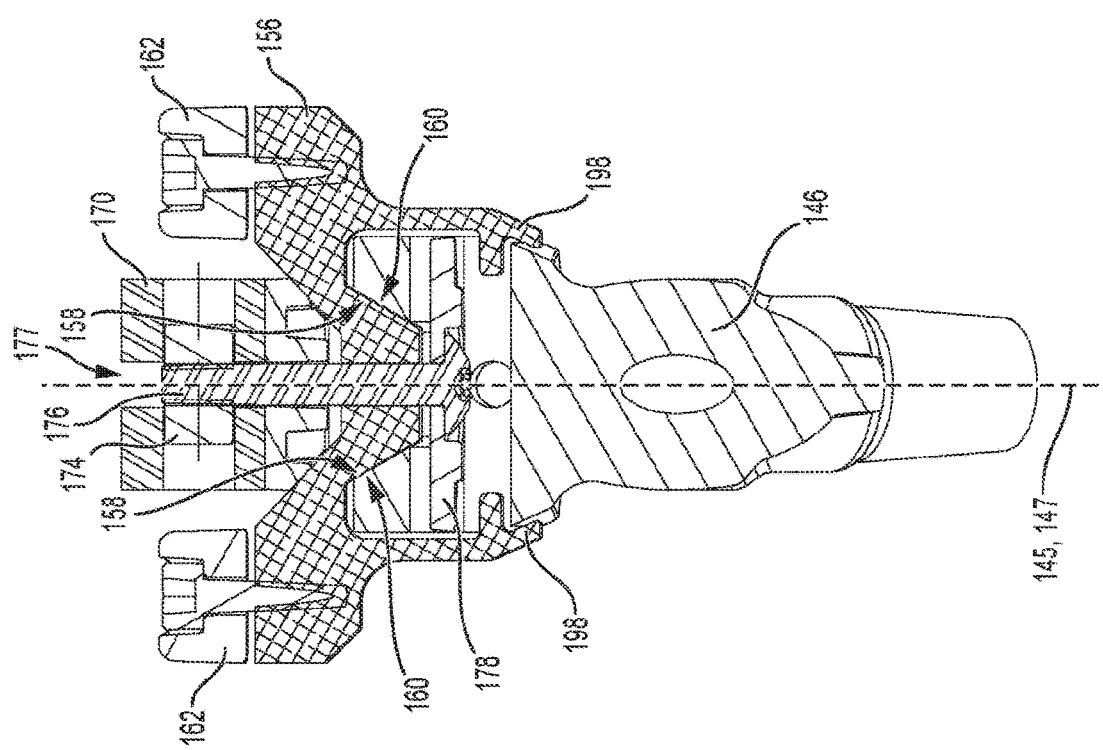
FIG. 11 is a cross-section of the steering assembly of FIG. 4, taken along section line 11-11 of FIG. 9.
Figure 12:
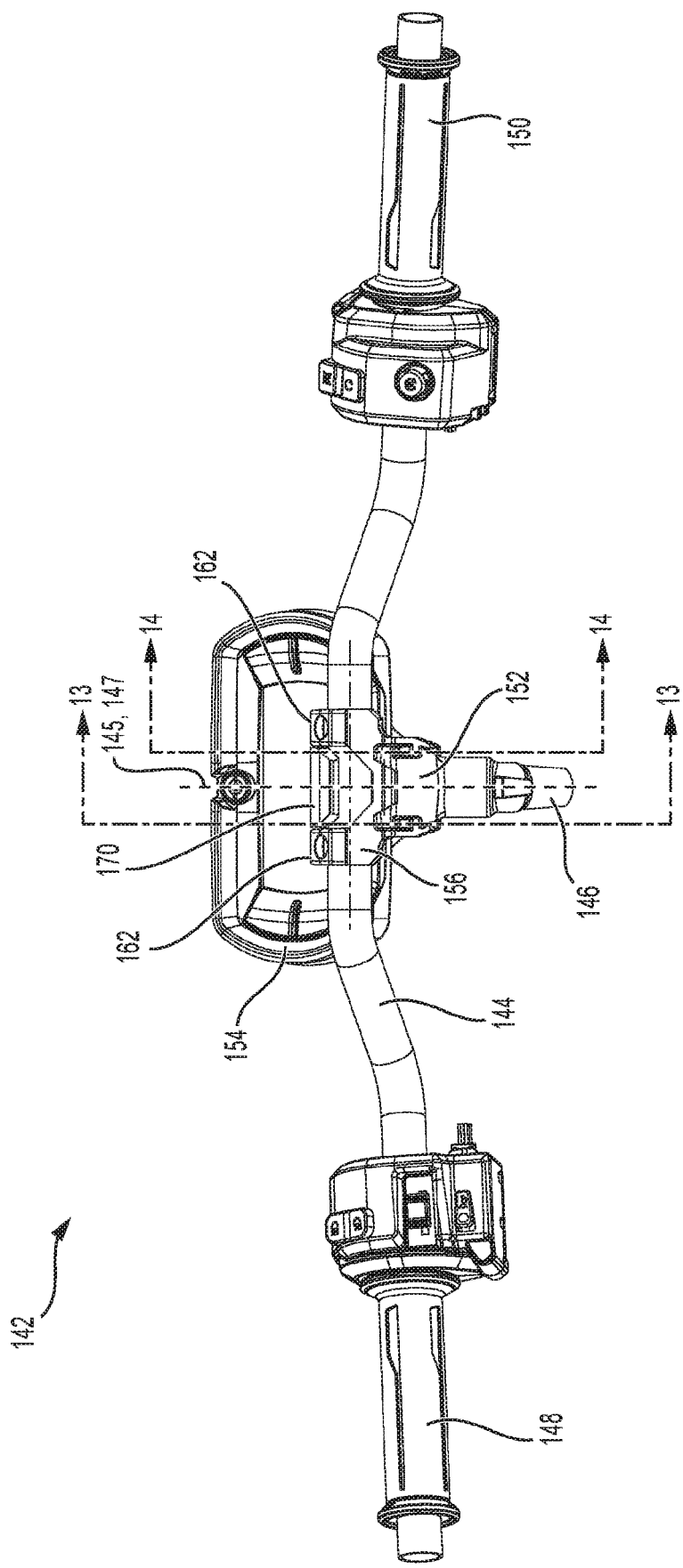
FIG. 12 is a rear side elevation view of the steering assembly of FIG. 4.
Figure 13:
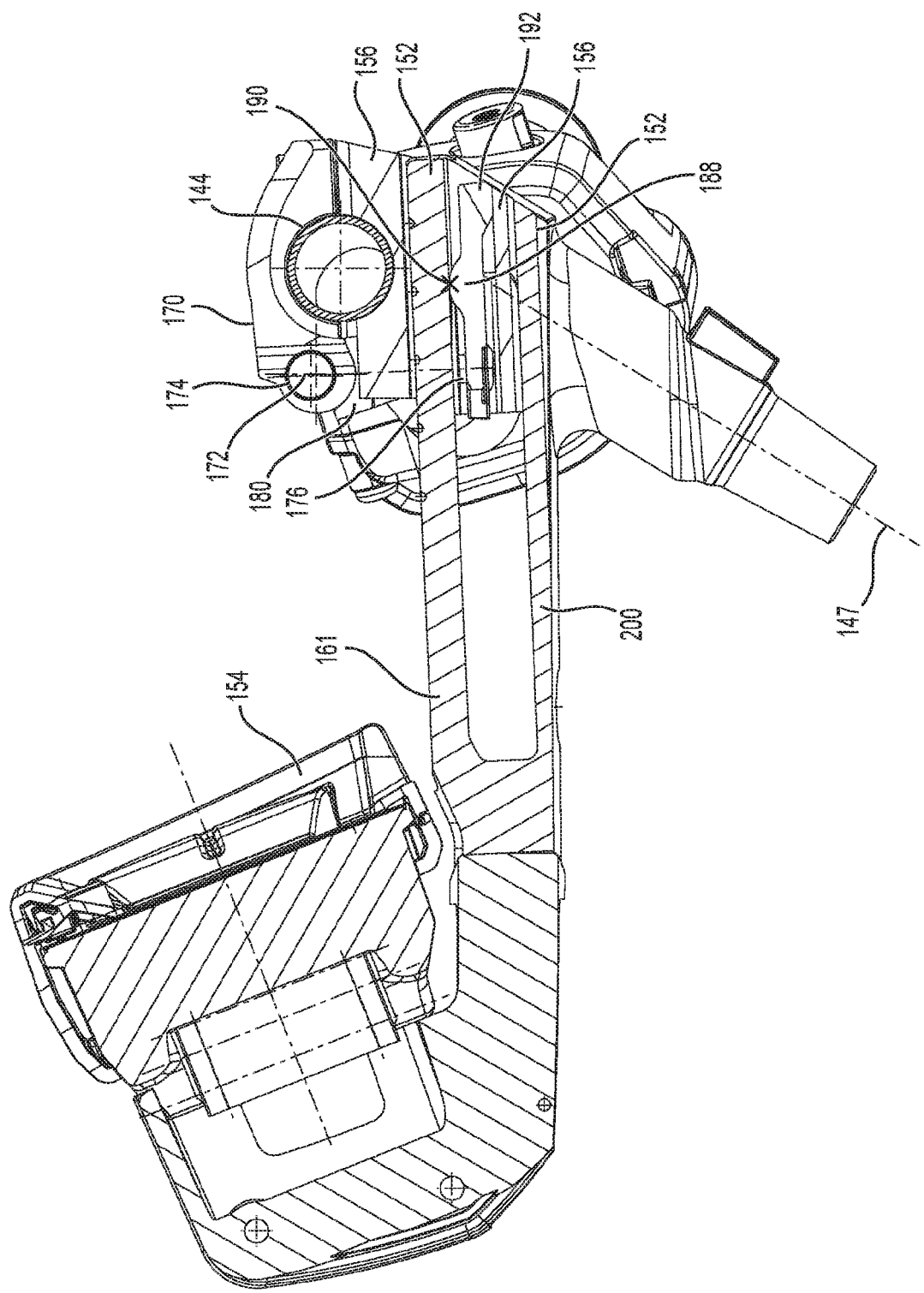
FIG. 13 is a cross-section of the steering assembly of FIG. 4, taken along section line 13-13 of FIG. 12.
Figure 14:
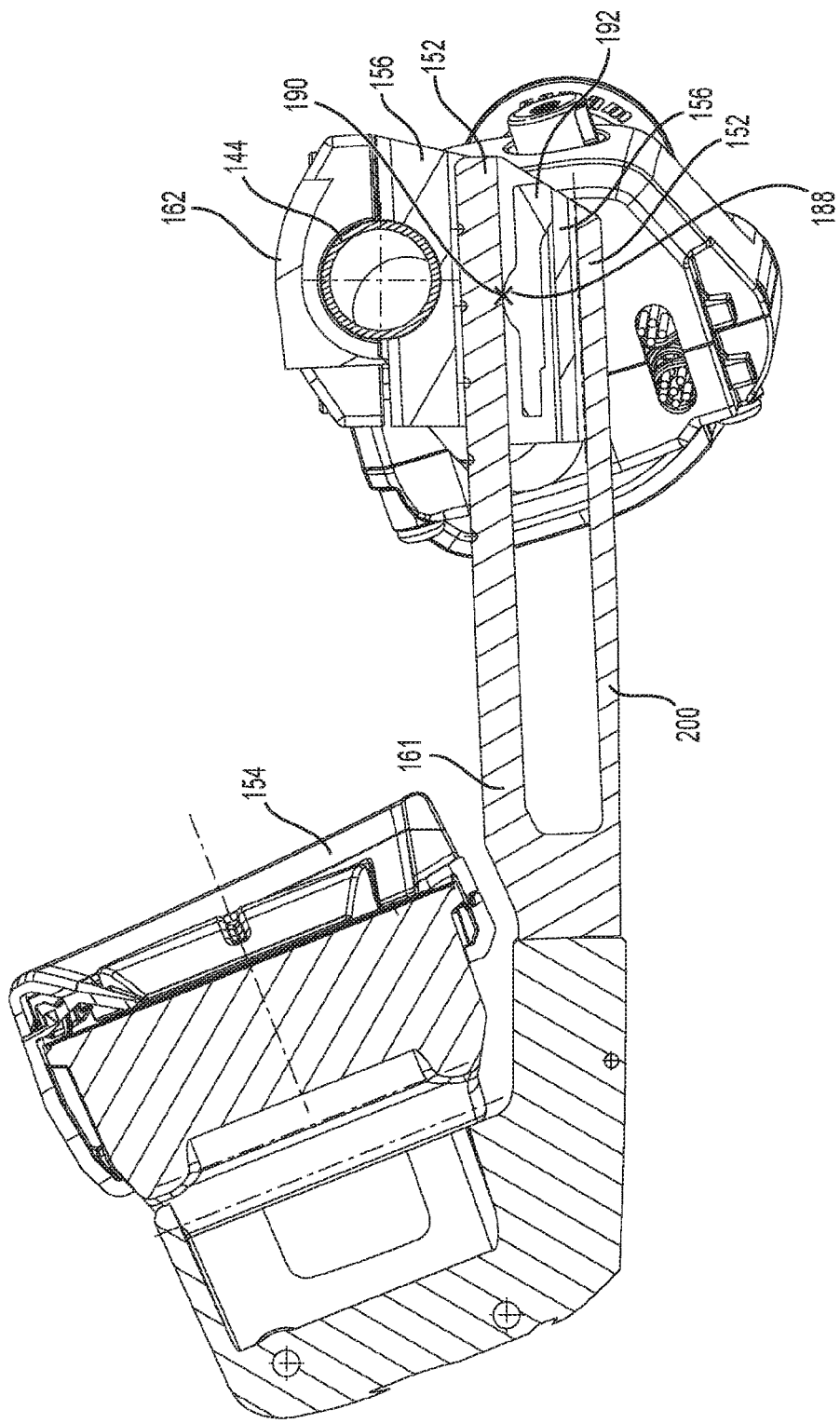
FIG. 14 is a cross-section of the steering assembly of FIG. 4, taken along section line 14-14 of FIG. 12.

As shown in FIGS. 10, 11 and 13 to 16, the rocker 178 is positioned between the rails 161 of the track 152 and the lower portion 155 of the track 152, with the ledges 203 of the slider 156 being positioned between the rocker 178 and the lower portion 155 of the track 152. As best shown in FIG. 11, in a direction from the shaft 174 toward the rocker 178, the elongate member 176 first passes through a slot 177 defined in the lever 170, then through an aperture 131 defined in a seat 180, then through an aperture 137 defined in the slider 156 and in between the rails 161, and is then received through the rocker 178. The slot 177 in the lever 170 is sized to allow for movement of the lever 170 between the locked and unlocked positions 166, 168 without its movement being impeded by the elongate member 176. The lever 170 is an example of an actuator. It is contemplated that a different actuator could be used, such as another type of manual actuator or a powered actuator. In this embodiment, the lever 170 extends over the handlebar 144 when the lever 170 is in the locked position 166, as can be seen in FIG. 13, leaving a space between the rearward extremity of the lever 170 and the slider 156 for the user to grasp the lever 170.

In this embodiment, the seat 180 is positioned between the lever 170 and the slider 156, and is disposed on a top side of the slider 156. The seat 180 and the handlebar 144 are positioned vertically between the lever 170 and the slider 156 when the lever 170 is in the locked position 166. As can be seen in FIG. 13, the shaft 174, the elongate member 176 and the seat 180 are positioned longitudinally between the handlebar 144 and the instrument display 154. As best shown in FIGS. 5 and 8, the slider 156 and the seat 180 have complementary angled surfaces 181, 183, respectively. The angled surfaces 181, 183 are pressed together by the lever 170 and the rocker 178 when the lever 170 is in the locked position 166. This engagement between the angled surfaces 181, 183 helps secure the lever 170, the seat 180, the elongate member 176 and the rocker 178 relative to the slider 156, and therefore relative to the track 152, when the lever 170 is in the locked position 166, as will be discussed in further detail below.

Figure 15:
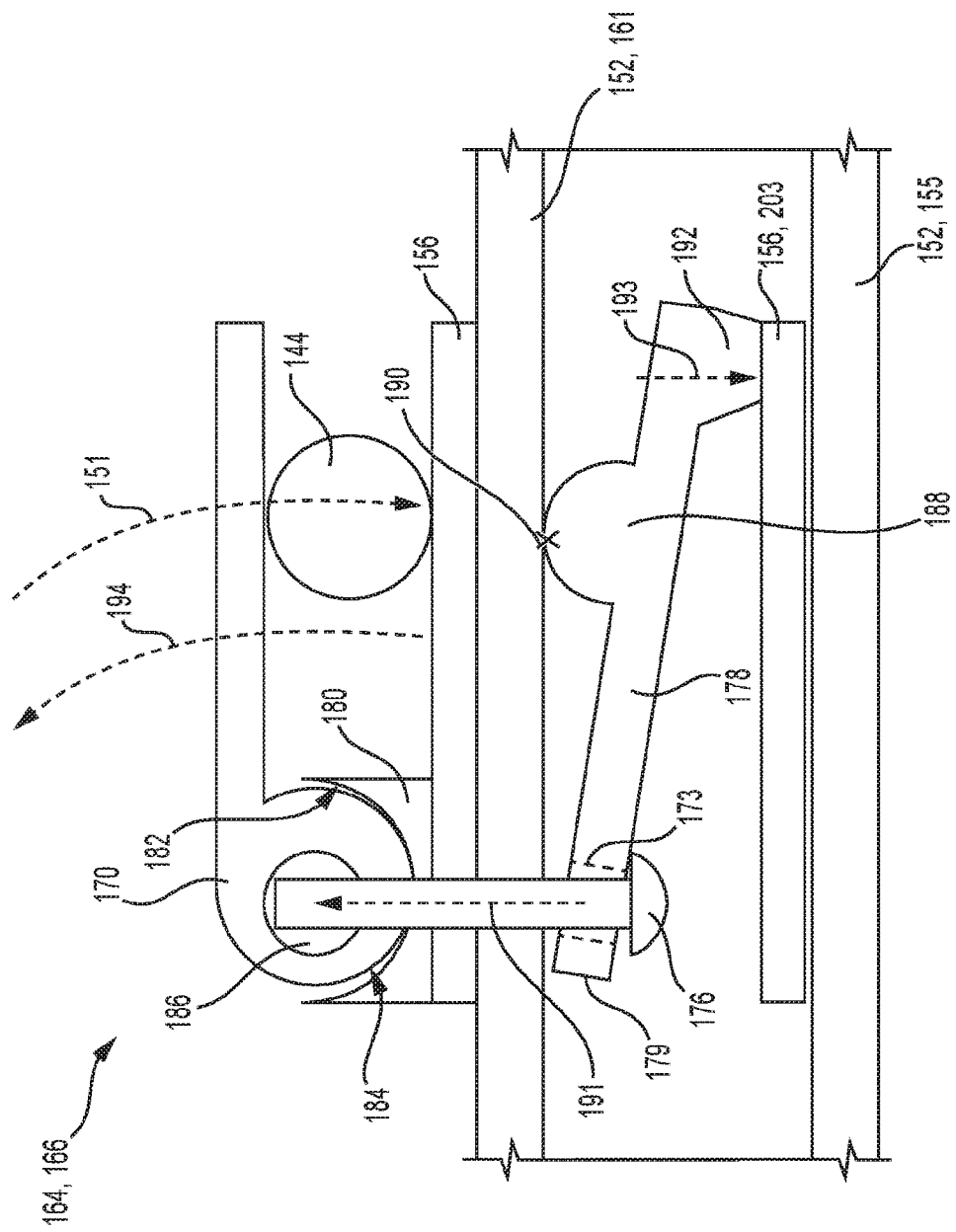
FIG. 15 is a left side elevation schematic view of some interoperable parts of the steering assembly of FIG. 4, the parts being brought into and shown in a single vertical plane to facilitate understanding, with the lock actuator being in the locked position.
Figure 16:
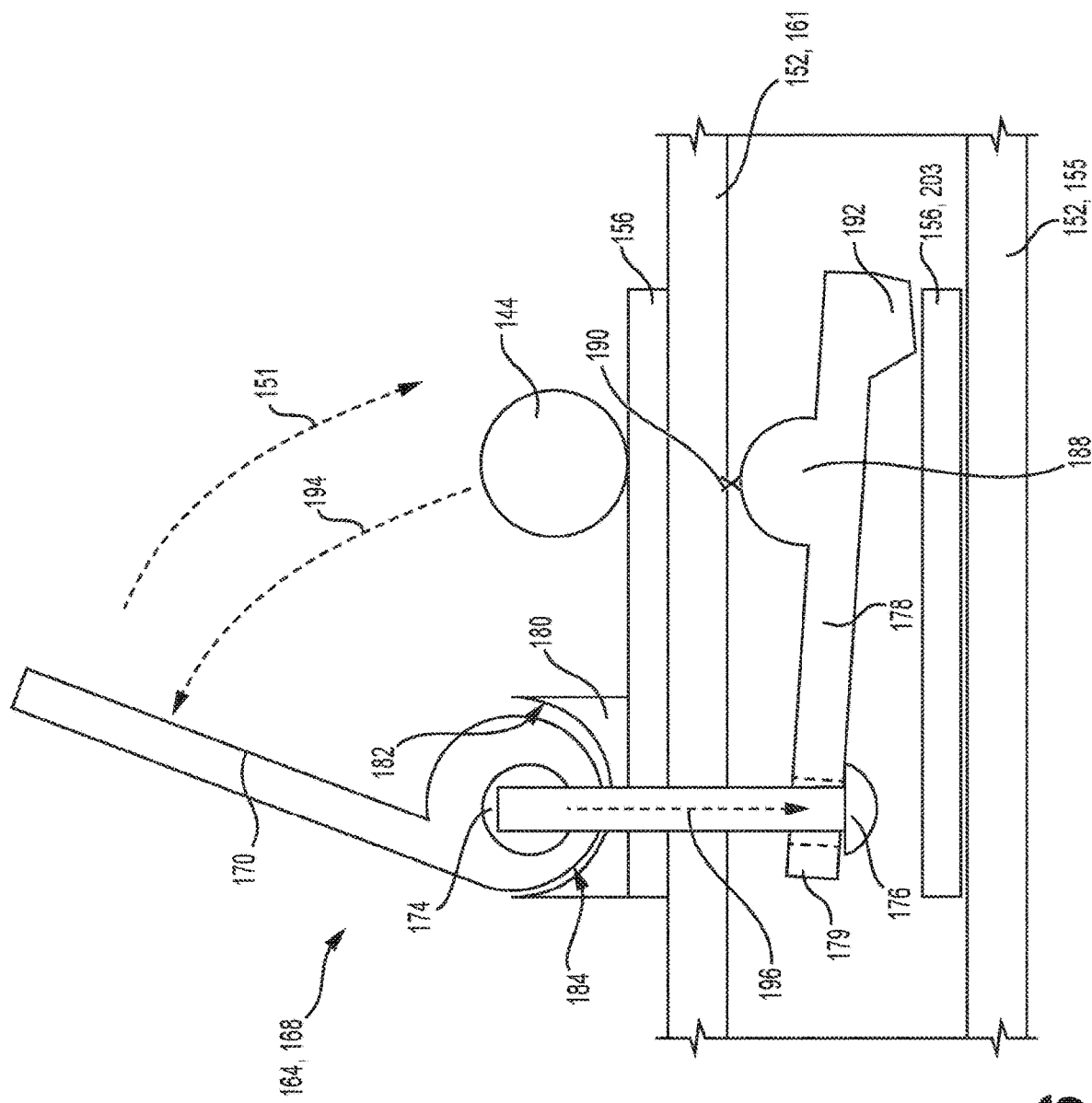
FIG. 16 is a left side elevation schematic view of some interoperable parts of the steering assembly of FIG. 4, the parts being brought into and shown in a single vertical plane to facilitate understanding, with the lock actuator being in the unlocked position.

FIGS. 15 and 16 bring the various interoperable parts shown in FIGS. 8 to 14 into a single plane to help the reader's understanding of the relative arrangements of these parts. In an alternative embodiment, those same interoperable parts are disposed in such a single plane. As best shown in FIG. 8, and schematically in FIGS. 15 and 16, the seat 180 defines a concave seat surface 182 in a top side thereof. The lever 170 defines a convex outer surface 184 that abuts the concave seat surface 182 of the seat 180. In the present embodiment, the convex outer surface 184 of the lever 170 is generally cylindrical and eccentric relative to the lever pivot axis 172. As a result of this eccentricity, pivoting of the lever 170 about the lever pivot axis 172 between the unlocked and locked positions 168, 166 moves the lever pivot axis 172, the shaft 174 and the elongate member 176 relative to the track 152, as described in more detail herein below, for selectively pivoting the rocker 178 and thereby selectively securing the slider 156 and the handlebar 144 in place relative to the track 152. To this end, the rocker 178 includes a pair of upwardly facing protrusions 188 which are positioned rearward of the front portion 179 of the rocker 178. As best shown in FIGS. 15 and 16, the upwardly facing protrusions 188 contact the bottom surfaces of the rails 161 of the track 152 to define a rocking axis 190 about which the rocker 178 rocks or pivots. In this embodiment, the rocking axis 190 is perpendicular to the steering axis 147 and the sliding axis 153. It will be appreciated that the rocking axis 190 moves relative to the track 152 when the lock actuator 164 moves relative to the track 152.

As schematically shown in FIGS. 15 and 16, the rails 161 of the track 152 are positioned between the lever 170 and the rocker 178. As shown with arrow 151 in FIG. 15, pivoting the lever 170 from the unlocked position 168 toward the locked position 166 pulls up the elongate member 176 relative to the slider 156 as shown by arrow 191. The elongate member 176 in turn pulls up the front portion 179 of the rocker 178 toward the rails 161, in the direction of the arrow 191, causing the rocker 178 to pivot clockwise (with reference to FIG. 15) about the rocking axis 190 relative to the slider 156. The rocker 178 includes a pair of downwardly extending protrusions 192 that form the surfaces that contact corresponding ones of the ledges 203 of the slider 156 (which are disposed below the rocker 178) when the lever 170 is pivoted toward the locked position 166, as shown in FIGS. 10 and 15. Once the protrusions 192 come into contact with the corresponding ones of the ledges 203, further pivoting of the lever 170 toward the locked position 166 presses the protrusions 192 down against the corresponding ones of the ledges 203 of the slider 156 as shown with arrows 193 (FIGS. 10 and 15). The rocker 178 thereby pushes the ledges 203 downward (in the direction of mows 193) away from the rails 161.

In turn, this presses the angled surfaces 160 of the slider 156 against the angled surfaces 158 of the rails 161 until the lever 170 reaches the locked position 166 and the surfaces 158 and 160 are sufficiently pressed together to frictionally lock the slider 156 and the handlebar 144 in position relative to the rails 161. It is contemplated that the lower portion 155 of the track 152 and the ledges 203 of the slider 156 could be shaped relative to one another to provide for additional frictional engagement between the slider 156 and the track 152 by being compressed together by the rearwardly extending protrusions 192 of the rocker 178 when the lever 170 is in the locked position 166. It is also contemplated that the front portion 179 of the rocker 178 could be shaped to frictionally engage a bottom surface of one or both of the rails 161 when the lever 170 is in the locked position 166, to provide for additional securement of the slider 156 relative to the track 152. Combinations of such arrangements frictional securements are also contemplated.

In the present embodiment, the complementary angled surfaces 158, 160 are symmetric about a plane 201 (FIGS.

2, 10 and 11) defined by the sliding axis 153 and the steering axis 147. In this implementation, the plane 201 and the plane of symmetry 145 of the track 152 are coplanar, and the angled surfaces 158 and 160 are angled such that, when engaged, the angled surfaces 158 are laterally outward from, i.e. are farther from the plane 145, 201 than, the angled surfaces 160. The symmetrical arrangement and angled orientation help improve force distribution and engagement between various parts of the steering assembly 142 when the lever 170 is in the locked position 166. Notably, these surfaces 158, 160 help in the transfer of forces between the slider 156 and the track 152 when the handlebar 144 bar is turned about the steering axis 147. It is contemplated that a different number of the angled surfaces 158, 160 and/or rails 161 could be used, and/or that non-symmetric arrangements could be used. It is further contemplated that the rails 161 and the slider 156 could be arranged such that the angled surfaces 158 are laterally inward from, i.e. closer to the plane 145, 201 than, the angled surfaces 160. It will be appreciated that the planes 145, 201 and the centerplane 106 are coplanar only in the straight-ahead position shown in FIG. 1, and that the planes 145, 201 pivot about the steering axis 147 as the handlebar 144 is turned to steer the vehicle 100.

In this embodiment, the downwardly extending protrusions 192 of the rocker 178 are sized and shaped such that they contact the slider 156 on one side (rearward) of the handlebar 144, whereas the front portion 179 of the rocker 178 is on the opposite side (forward) of the handlebar 144. Similarly, the contact points between the downwardly extending protrusions 192 and the slider 156 are on the one side of the handlebar 144, whereas the shaft 174, the elongate member 176, and the seat 180 are on the opposite side of the handlebar 144. In this embodiment, and as seen in FIG. 10, the contact points between the downwardly extending protrusions 192 are on opposite sides of the steering axis 147 when viewed from the rear. It is contemplated that a different number and/or arrangement of the protrusions 188 and/or 192 could be used, and that the protrusions 192 could be omitted. The construction and arrangement of these parts of the steering assembly 142 is shown in additional detail in FIGS. 9 to 14, and more particularly in the cross-sectional views of FIGS. 10, 11, 13 and 14. The engaged position is shown in the schematic in FIG. 15.

Now referring to FIG. 16, pivoting the lever 170 manually from the locked position 166 toward the unlocked position 168 as indicated by arrow 194 moves the elongate member 176 relative to the slider 156 in a direction shown by anow 196. The elongate member 176 moves the front portion 179 of the rocker 178 in the direction shown with anow 196, causing the rocker 178 to pivot counter-clockwise (with reference to FIG. 16) about the rocking axis 190 relative to the slider 156, thereby causing downwardly extending protrusions 192 of the rocker 178 to disengage the ledges 203 of the slider 156 and thereby release the slider 156 and handlebar 144 from that position on the track 152. That is, the rocker 178 releases the slider 156 from the track 152 and allows the slider 156, the lever 170, the elongate member 176, the rocker 178, and the handlebar 144 to slide together (as a unit) along the track 152 along the sliding axis 153 to any other handlebar adjustment position. Once a different handlebar adjustment position has been selected, the lever 170 can be manually pivoted back to the locked position 166 to lock the slider 156, the lever 170, the elongate member 176, the rocker 178, and the handlebar 144 in place in the different handlebar adjustment position. This allows a driver of the vehicle 100 to adjust the position of the handlebar 144 relative to the rest of the vehicle 100.

The forward extremity of the track 152 between the front of the rails 161 is closed, which prevents complete disengagement of the slider 156 from the track 152 in a forward direction along the sliding axis 153 while the lever 170 is in the unlocked position 168. However, in order to permit assembly of the slider 156 onto the track 152, the portion of the track 152 between the rear of the rails is opened. To help prevent complete disengagement of the slider 156 from the track 152 in a rearward direction along the sliding axis 153, the slider 156 has a bolt 204 (FIGS. 5 to 7 and 10) received therethrough. The bolt 204 extends through the slider 156 and engages a rear portion of the track 152 when the slider 156 is in its rearmost position. It is contemplated that other combinations of elements could be used to define the limits of the positions of the slider 156 along the track 152.

To remove the lock actuator 164 and the handlebar 144 from the track 152, the bolt 204, the elongate member 176 and rocker 178 are removed and the rest of the lock actuator 164 and the handlebar 144 can be slid in the rearward direction along the sliding axis 153 until disengaged. To enable removal of the elongate member 176, the track 152 defines an aperture 206 (FIG. 9) in the lower portion 155 thereof. The aperture 206 is positioned toward the front of the track 152. With the slider 156 and in its forwardmost position along the track 156, the head of the elongate member 176 is aligned with the aperture 206 and is thereby accessible to be disengaged from the shaft 174 with a tool, such as a screwdriver for example. It will be appreciated that a similar process can be applied to tighten or loosen the bolt 176 and thereby tighten or loosen the clamping applied when moving the lever 170 from the unlocked position 168 to the locked position 166. It will further be appreciated that the reverse process can be applied to assemble the steering assembly 142. It is contemplated that a different construction of the track 152 could be used which could for example allow for a different method of assembly and disassembly of the steering assembly 142.

The parts of the steering assembly 142 in the illustrated embodiment are made of metal. However, it will be appreciated that the other embodiments may be manufactured and assembled using any other suitable combination of conventionally known materials and methods of manufacture.

Modifications and improvements to the above-described embodiment of the present technology may become apparent to those skilled in the art. The foregoing description is intended to be exemplary rather than limiting.

What is claimed is:

1. A steering assembly for a vehicle, comprising:
   a track pivotable about a steering axis;
   a slider slidably connected to the track;
   a handlebar connected to the slider;
   a lock actuator movable between a locked position and an unlocked position; and
   a rocker operatively connected to the lock actuator, the rocker being pivotable about a rocking axis relative to the slider in response to movement of the lock actuator,
   the handlebar, the slider, the lock actuator and the rocker being pivotable about the steering axis with the track,
   in the unlocked position of the lock actuator, the rocker and the handlebar being slidable along the track with the slider, and
   in the locked position of the lock actuator, the rocker pressing the slider against the track for locking the slider, the rocker and the handlebar in position relative to the track.

2. The steering assembly of claim 1, wherein the lock actuator is slidable along the track with the slider, the handlebar and the rocker when the lock actuator is in the unlocked position.

3. The steering assembly of claim 1, wherein the steering axis is perpendicular to the rocking axis.

4. The steering assembly of claim 1, wherein the track and the slider have complementary angled surfaces that are pressed together by the rocker when the lock actuator is in the locked position.

5. The steering assembly of claim 4, wherein:
the track defines a sliding axis along which the slider is slidable when the lock actuator is in the unlocked position;
the complementary angled surfaces are symmetric about a plane of symmetry when the lock actuator is in the locked position; and
the sliding axis is in the plane of symmetry.

6. The steering assembly of claim 5, wherein:
the angled surfaces of the track face toward the plane of symmetry, and
the angled surfaces of the slider face away from the plane of symmetry toward the angled surfaces of the track.

7. The steering assembly of claim 5, wherein the angled surfaces of the track extend downward and toward the plane of symmetry.

8. The steering assembly of claim 5, wherein the sliding axis is perpendicular to the rocking axis.

9. The steering assembly of claim 1, wherein the rocker includes at least one protrusion contacting the track, the at least one protrusion defining the rocking axis.

10. The steering assembly of claim 1, wherein the lock actuator includes a lever manually pivotable about a lever pivot axis between the locked and the unlocked positions.

11. The steering assembly of claim 10, wherein the track is positioned at least in part between the lever and the rocker.

12. The steering assembly of claim 10, wherein:
the lock actuator further includes a shaft and an elongate member,
the shaft defines the lever pivot axis,
the lever is pivotable about the shaft between the locked and unlocked positions,
the elongate member is perpendicular to the shaft, and
the elongate member connects the rocker to the shaft for pivoting the rocker about the rocking axis as the lever pivots between the locked and unlocked positions.

13. The steering assembly of claim 10, further comprising a seat defining a concave seat surface; and wherein:
the lever includes a cylindrical outer surface abutting the concave seat surface, and
the cylindrical outer surface is eccentric relative to the lever pivot axis such that the lever pivot axis, the shaft and the elongate member move relative to the track as the lever pivots between the locked and unlocked positions for pivoting the rocker about the rocking axis.

14. The steering assembly of claim 13, wherein the seat and the slider have complementary angled surfaces that are pressed together by the lever and the rocker when the lever is in the locked position.

15. The steering assembly of claim 13, wherein:
the shaft, the elongate member and the seat are on a first longitudinal side of the handlebar; and
the rocker includes at least a portion that contacts the slider on a second longitudinal side of the handlebar when the lever is in the locked position, the second longitudinal side of the handlebar being opposite the first longitudinal side of the handlebar.

16. The steering assembly of claim 13, further comprising an instrument display mounted to the track; and wherein the shaft, the elongate member and the seat are positioned between the handlebar and the instrument display.

17. The steering assembly of claim 13, wherein the seat and the handlebar are positioned between the lever and the slider when the lever is in the locked position.

18. The steering assembly of claim 10, wherein the lever extends over the handlebar when the lever is in the locked position.

19. The steering assembly of claim 10, wherein:
the track defines at least one rail along which the slider is slidable when the lock actuator is in the unlocked position;
the handlebar, the lever and at least a portion of the slider are disposed on a first side of the at least one rail; and
the rocker is disposed on a second side of the at least one rail, the second side of the at least one rail being opposite the first side of the at least one rail.

20. The steering assembly of claim 1, further comprising a steering column operatively connected to the track; and
wherein the steering column defines the steering axis and is pivotable about the steering axis with the track.

21. A vehicle comprising:
a straddle seat;
the steering assembly of claim 1 disposed at least in part forward of the straddle seat, in the unlocked position of the lock actuator, the handlebar being movable relative to the straddle seat; and
at least one steerable component being operatively connected to the steering assembly for steering the vehicle when the handlebar is pivoted about the steering axis.

22. The vehicle of claim 21, wherein the at least one steerable component is at least one wheel.

23. The vehicle of claim 22, wherein:
the at least one wheel is two front wheels;
the vehicle further comprises:
a frame;
at least one rear wheel operatively connected to the frame; and
a motor connected to the frame and operatively connected to the at least one rear wheel; and
the two front wheels are operatively connected to the frame.

* * * * *